L. NATHAN.
BREWING BEER.
APPLICATION FILED OCT. 4, 1904.
915,791.
Patented Mar. 23, 1909.
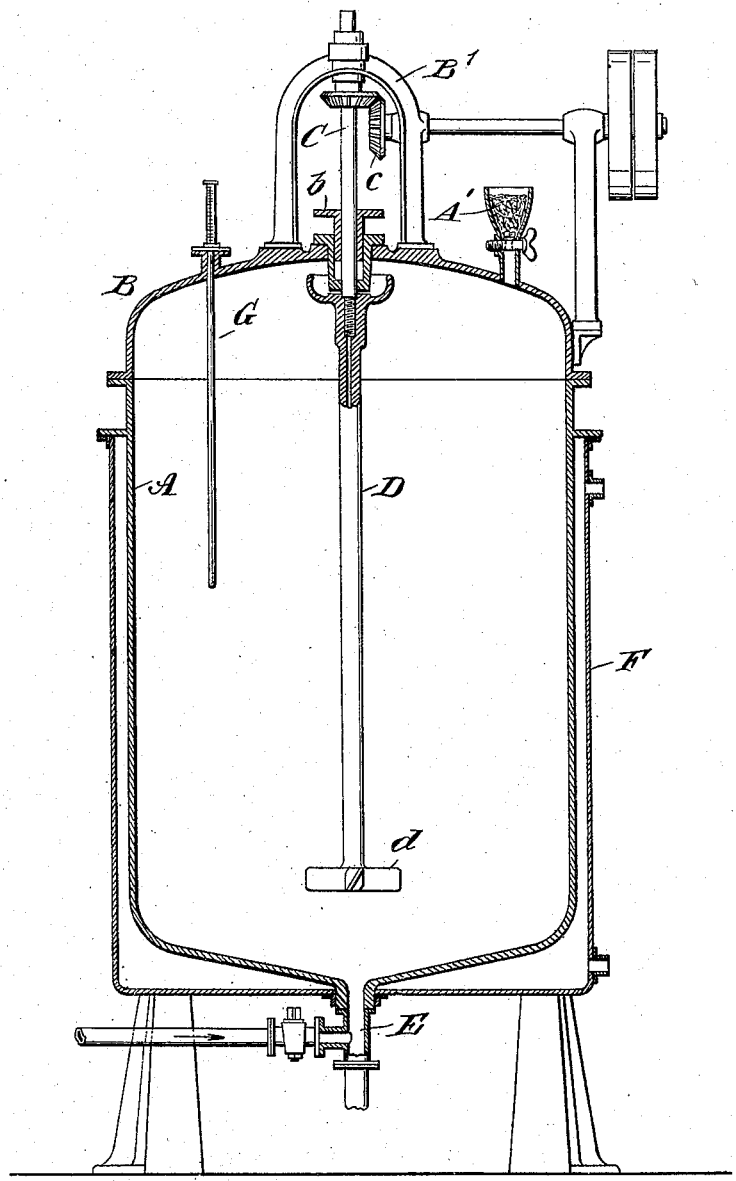
Witnesses
Julius M. Lutz
John Lotka
Inventor
Leopold Nathan
By Briesen & Knauth
Attorneys

UNITED STATES PATENT OFFICE.

LEOPOLD NATHAN, OF ZURICH, SWITZERLAND.

BREWING BEER.

No. 915,791.     Specification of Letters Patent.     Patented March 23, 1909.

Application filed October 4, 1904. Serial No. 227,089.

*To all whom it may concern:*

Be it known that I, LEOPOLD NATHAN, chemist, residing at 104 Ausstellungsstrasse, Zurich, Switzerland, have invented new and useful Improvements in Brewing Beer, of which the following is a specification.

This invention relates to fermentation in that system of beer-brewing wherein the fermentation takes place in a sterile manner and is particularly applicable to those rapid brewing processes in which the liquor is subjected to violent agitation.

The process forming the subject of my invention is based on the discovery that the hitherto accepted theory regarding the rôle played by the air during the growth of the yeast in the attendant fermentation is erroneous. Hitherto the generally accepted idea has been that in order to obtain the best results and a rapid fermentation an excess of air must be supplied to the vessel and caused to make as intimate contact with the liquor as possible. Even in those cases where an excess of air was not supplied it has been customary to allow the wort to absorb air to saturation during cooling. I have however discovered that the quantity of air which the wort takes up during the time it occupies in cooling so far from being insufficient is as a matter of fact excessive if the fermenting liquor is kept in motion by stirring or otherwise. If the wort is thoroughly saturated with air during the cooling process and the liquor subsequently agitated during the fermentation process, the growth of yeast is so rapid that double the quantity ordinarily obtained from fermentations unaccompanied by agitation is produced. One effect of this excessive yeast generation is that the beer is deprived of an excessive quantity of useful constituents and consequently lacks body.

I have discovered that not only does a smaller quantity of air than that spontaneously taken up by the wort in cooling suffice for insuring a good fermentation with the ultimate object of producing a good beer, but that it is actually advantageous to use such smaller quantity provided only that the whole of the air is brought into contact with the yeast in a suitable manner so that on the one hand the latter can fully utilize it and on the other hand that the prejudicial action on the activity of the yeast of products such as $CO_2$ which themselves result from this activity may be limited as far as possible. The well known methods of stirring the wort may be employed.

Hitherto it has been customary to aerate the liquor during fermentation by forcing air through or into the liquor. Now I have carried out a series of experiments which conclusively show that the acceleration of the fermentation connected with aeration must not be attributed, as has hitherto been the case, to the air (or rather the oxygen) itself, but to the agitation of the liquor caused by the act of aerating it, which agitation results in the above-mentioned enormous yeast growth. In the presence of a sufficiently large quantity of oxygen energetic agitation will inevitably result in an excessive yeast generation; nevertheless such agitation is necessary for the removal of the carbon di-oxid produced in the fermentation since the di-oxid opposes the further generation of yeast. The end in view is therefore to keep the generation of yeast within proper determinate limits while at the same time permitting of the energetic agitation of the fermenting liquid, and I have discovered how this end may be reached by quantitatively determining the proportion of air which should be supplied to the wort. The advantage, in such a process, of being able to supply the exact quantity of air necessary consists in the fact that after the exact quantity of yeast which will result from the fermentation has been ascertained by a few operations, it becomes possible to foretell the amount of yeast which will be produced under similar circumstances. Too rapid a generation of yeast with its well-known attendant evils will not take place, nor, on the other hand will the fermentation be too sluggish so long as the whole of the predetermined volume of air is utilized.

Hitherto with a plentiful supply of air the mechanical action of the fermentation itself consisted in a continual rising and falling of the yeast cells to and from the surface of the liquid which action had the beneficial effect of keeping the whole body of the liquid in motion. But in my process owing to the reduction in the air supply this automatic agitation does not take place and consequently it is necessary to keep the yeast-cells in motion by artificially agitating the liquor.

The simplest method of procedure according to my process is to add to the wort the whole predetermined volume of air to be supplied before the commencement of the fermentation, but it may of course be found advantageous in some cases to gradually introduce the air during the fermentation. There are tables (available to brewers) which indicate the amount of air required for fermenting various worts. For instance a 12% wort requires about 3 cubic centimeters of oxygen for each liter of wort. A stronger wort requires more oxygen, and a weaker one, less. In practice it may for instance be found necessary within certain limits to subsequently add a further quantity of air to the fermenting liquor if the development of the fermentation shows that the full amount of air required by the table has not been supplied and that, therefore, a supplement of air is necessary or advisable. Assuming that the predetermined necessary quantity of air is supplied to the wort before the addition of the yeast, the simplest method of regulating the air-supply is by observing the fall of temperature, that is by cutting off the air supply as soon as the temperature of the wort has fallen to a given point which is determined empirically and for instance may be 50° centigrade. Any tendency to produce a vacuum consequent on a further drop in temperature may be easily dealt with by the admission of carbon di-oxid or other inert gas during such further cooling.

The agitation of the liquor may be effected by any mechanical means but is preferably brought about by blowing in an inert gas such as carbon di-oxid whose presence has for effect to restrain the activity of the yeast, this property (viz. that of tending to stop the further activity of the organisms) being common to all decomposition-products resulting from the activity of micro-organisms. In the present case however, the activity is only retarded to a slight extent, the restraining action not coming into play to such an extent as to actually prevent the action of the dissolved air on the yeast cells. In some cases this may be advantageous since it is often desirable to prevent an excessive growth of yeast.

The method of carrying out my process may be one of extreme simplicity, in some cases it being simply necessary to exclude air from the fermenting tun as soon as the wort has received the amount of air which the table indicates.

In practice the process may advantageously be carried out in the following manner by means of an apparatus of the character illustrated in the accompanying drawing which is a vertical section of such apparatus.

A is a suitable vessel having a cover B with a stuffing box $b$ for the passage of the shaft C, journaled in a bracket B' and driven by bevel gearing $c$. The shaft C carries the spindle D, provided with a stirrer $d$.

E indicates a pipe through which, at different stages of the process, sterilized air and yeast may be introduced into the apparatus. The shaft C and spindle D are hollow for the purpose of introducing carbonic acid gas, and if desired, the air may also be introduced through the shaft and spindle instead of through the pipe E.

F is a jacket through which water or brine may be circulated to cool the wort contained in the vessel A.

G is a thermometer passing through the cover B.

The hot wort is run into the sterilized vessel A and allowed to cool therein. When the temperature has fallen to about 50° centigrade the air supply, which may be taken from the surrounding atmosphere and supplied through a wadding stopper A', is cut off and the upper portion of the vessel is connected to a source of sterile carbon di-oxid through the shaft C and spindle D. I supply as much carbon dioxid as the wort is capable of absorbing. The temperature of the contents of the vessel is then allowed to fall to the point at which the fermentation is to take place (for instance from 10 to 15° centigrade) whereupon a measured quantity of yeast is added, the measured quantity of course bearing the correct proportion to the volume of air supplied. I prefer that the amount of air admitted should be such as to cause the yeast to grow during fermentation, to about three or four times its original amount. The fermentation is thereupon started, the liquor being continually stirred during this process. If the agitation of the liquor is to be effected by blowing in carbon dioxid, the quantity of air which is supplied after the cooling of the wort must be increased in proportion to the diminution of yeast growth produced by the quantity of $CO_2$ supplied. It is well known that carbon dioxid retards fermentation, and this is the reason why I use a greater amount of air when carbon dioxid is supplied not only in a quantity such as the wort will absorb, but in an additional amount whose purpose is to agitate the wort. The total amount of air is however never equal to that which the wort would absorb if air had free access to it during the entire cooling operation. Another effect produced by the treatment with $CO_2$ is that the raw bouquets produced during the fermentation are partly carried off by the $CO_2$ so that the length of the well-known subsequent treatment of the beer with a current of $CO_2$ subsequent to the completion of the fermentation is diminished.

The carbonic acid gas which is introduced for the purpose of passing it through the wort, as well as the carbonic acid gas produced by fermentation, may be carried off in any suitable manner.

Now what I claim and desire to secure by Letters Patent is the following:

1. Process for the production of beer which consists in supplying to the wort a quantity of air less than the amount which would be spontaneously taken up or absorbed by the wort when allowed to cool to the temperature at which it is desired to ferment the wort, and then bringing about fermentation.

2. Process for producing beer which consists in cooling a hot wort, admitting air during the cooling operation, stopping the admission of air, continuing the cooling after the admission of air has been interrupted, and then causing the wort to ferment.

3. Process of producing beer which consists in cooling a hot wort down to about 50° centigrade, introducing air during such cooling, continuing the cooling operation after the admission of air has been stopped, and then causing the wort to ferment.

4. Process of producing beer which consists in cooling a hot wort, admitting air thereto during the cooling operation, continuing the cooling operation after the admission of air has been stopped, admitting an inert gas during this second period of cooling, and then causing the wort to ferment.

5. Process of producing beer which consists in cooling the hot wort with simultaneous admission of air, then continuing the cooling after the admission of air has been stopped, introducing carbon dioxid during such continued cooling, and then causing the wort to ferment.

6. Process of producing beer which consists in adding to the wort an amount of air less than that which would be spontaneously taken up or absorbed by the wort when allowed to cool to the temperature at which it is desired to ferment the wort, and then causing the wort to ferment, and agitating it during such fermentation.

7. Process of producing beer which consists in cooling the wort and then causing it to ferment, and agitating it during fermentation, air being admitted during the process in a smaller quantity than the amount which would be spontaneously taken up or absorbed by the wort when allowed to cool to the temperature at which it is desired to ferment the wort.

In testimony, that I claim the foregoing as my invention, I have signed my name in presence of two witnesses, this twenty first day of September 1904.

LEOPOLD NATHAN.

Witnesses:
LÉON DU COMMUN,
WILHELM GRAAFF.